(12) United States Patent
Meisner et al.

(10) Patent No.: US 7,029,649 B2
(45) Date of Patent: Apr. 18, 2006

(54) COMBINATIONS OF HYDROGEN STORAGE MATERIALS INCLUDING AMIDE/IMIDE

(75) Inventors: Gregory P. Meisner, Ann Arbor, MI (US); Michael P. Balogh, Novi, MI (US)

(73) Assignee: General Motors Corporation, Detroit, MI (US)

( * ) Notice: Subject to any disclaimer, the term of this patent is extended or adjusted under 35 U.S.C. 154(b) by 195 days.

(21) Appl. No.: 10/649,923

(22) Filed: Aug. 26, 2003

(65) Prior Publication Data

US 2005/0047994 A1    Mar. 3, 2005

(51) Int. Cl.
 C01B 3/04  (2006.01)
 C01B 3/06  (2006.01)
 C01B 3/08  (2006.01)

(52) U.S. Cl. .................................................. 423/658.2
(58) Field of Classification Search ........ 423/644–647, 423/658.2
 See application file for complete search history.

(56) References Cited

U.S. PATENT DOCUMENTS

| | | | |
|---|---|---|---|
| 6,015,041 A | 1/2000 | Heung | |
| 6,159,538 A | 12/2000 | Rodriguez et al. | |
| 6,267,229 B1 | 7/2001 | Heung | |
| 6,329,076 B1 | 12/2001 | Kawabe et al. | |
| 6,342,198 B1 | 1/2002 | Zaluska et al. | |
| 6,419,764 B1 | 7/2002 | Kamiya et al. | |
| 6,432,379 B1 | 8/2002 | Heung | |
| 6,444,361 B1 | 9/2002 | Komori et al. | |
| 2003/0113252 A1 | 6/2003 | Chen et al. | |
| 2003/0129122 A1 | 7/2003 | Chen et al. | |
| 2003/0129126 A1 | 7/2003 | Chen et al. | |

OTHER PUBLICATIONS

Chen, Ping, Xiong, Zhitao, Luo, Jizhong, Lin, Jianyi, Tan, Kuang Lee. "Hydrogen Storage in Metal Nitride Systems". Edited by Ricardo B. Schwartz Symposium V, Materials for Energy Storage, Generation and Transport, vol. 730, Apr. 2-4, 2002, pp. 376 and 385, V5.18.

Herbert Jacobs and Robert Juza, "Preparations and Properties of Magnesium Amide and Imide" Journal for Anorganic and General Chemistry, Band [vol.] 870 (1969) pp. 254-261. (English translation only; original German not available.).

Chen, Ping, Xiong, Zhitao, Luo, Jizhong, Lin, Jianyi, Tan, Kuang Lee. "Interaction of Hydrogen with Metal Nitrides and Imides" Nature Publishing Group [vol. 420] (Nov. 21, 2002) pp. 302-304 with Supplement pp. 1-6.

Robert Juza and Karl Opp, Metal amides and metal nitrades, 25$^{th}$ Part 1), Journal for Anorganic and General Chemistry. 1951 Band vol. 266, pp. 325-330. (2 documents: English translation and original German.).

*Primary Examiner*—Colleen P. Cooke
(74) *Attorney, Agent, or Firm*—Kathryn A. Marra

(57) ABSTRACT

The invention provides a method of reversibly producing a source of hydrogen gas comprising mixing together a plurality of hydrogen-containing starting materials; and then heating the mixed materials at a temperature sufficient to release hydrogen. Upon release of hydrogen, there is formed a residue which comprises at least one material different from the starting materials. There is also synergy whereby it is possible to regenerate at least one of the hydrogen-containing starting materials by exposing hydrogen gas to the aforesaid residue.

30 Claims, 2 Drawing Sheets

COMBINATIONS OF HYDROGEN STORAGE MATERIALS INCLUDING AMIDE/IMIDE

FIELD OF THE INVENTION

The present invention relates to hydrogen storage compositions, the method of making such hydrogen storage compositions and use thereof for storing hydrogen.

BACKGROUND OF THE INVENTION

Hydrogen is desirable as a source of energy because it reacts cleanly with air producing water as a by-product. In order to enhance the desirability of hydrogen as a fuel source, particularly for mobile applications, it is desirable to increase the available energy content per unit volume of storage. Presently, this is done by conventional means such as storage under high pressure, at thousands of pounds per square inch, cooling to a liquid state, or absorbing into a solid such as a metal hydride. Pressurization and liquification require relatively expensive processing and storage equipment.

Storing hydrogen in a solid material such as metal hydrides, provides volumetric hydrogen density which is relatively high and compact as a storage medium. Binding the hydrogen as a solid is desirable since it desorbs when heat is applied, thereby providing a controllable source of hydrogen.

Rechargeable hydrogen storage devices have been proposed to facilitate the use of hydrogen. Such devices may be relatively simple and generally are simply constructed as a shell and tube heat exchanger where the heat transfer medium delivers heat for desorption. Such heat transfer medium is supplied in channels separate from the chamber which houses the hydrogen storage material. Therefore, when hydrogen release is desired, hot fluid may be circulated through the channels, in heat transfer relationship with the storage material, to facilitate release of the hydrogen. To recharge the storage medium, hydrogen may be pumped into the chamber and through the storage material while the heat transfer medium removes heat, thus facilitating the charging or hydrogenating process. An exemplary hydrogen storage material and storage device arranged to provide suitable heat transfer surface and heat transfer medium for temperature management is exemplified in U.S. Pat. No. 6,015,041.

Presently, the selection of relatively light weight hydrogen storage material is essentially limited to magnesium and magnesium-based alloys which provide hydrogen storage capacity of several weight percent, essentially the best known conventional storage material with some reversible performance. However, there is limitation in that such magnesium based materials take up hydrogen at very high temperature and high hydrogen pressure. In addition, hydrogenation of the storage material is typically impeded by surface oxidation of the magnesium. Other examples such as $LaNi_5$ and TiFe that are reversible have relatively low gravimetric hydrogen storage density, since they are very heavy.

Therefore, in response to the desire for an improved hydrogen storage medium, the present invention provides an improved hydrogen storage composition, its use as a storage medium and a method for forming such materials.

SUMMARY OF THE INVENTION

In one aspect, the invention provides a combination of materials which when combined together provide advantages for storing hydrogen as compared to utilization of a single source hydrogen-containing compound. When a single source of hydrogen is used, it typically releases hydrogen only under extreme circumstances, and either is not capable of reinserting hydrogen or does so only under severe conditions.

The invention provides a method of reversibly producing a source of hydrogen gas comprising mixing together a plurality of hydrogen-containing starting materials; and then heating the mixed materials at a temperature sufficient to release hydrogen. Upon release of hydrogen, there is formed a residue which comprises at least one material different from the starting materials. There is also synergy whereby it is possible to regenerate at least one of the hydrogen-containing starting materials by exposing hydrogen gas to the aforesaid residue.

In one aspect, the preferred starting materials comprise an amide and an alanate, which are mixed together and then heated to release hydrogen. A residue is formed which comprises an imide. The regeneration is accomplished when the imide is exposed to hydrogen, thereby re-forming the amide.

Advantageously, the selection of such a plurality of starting materials leads to the ability to release hydrogen in stages, upon reaction or decomposition of any one of the starting materials, in the presence of, or by reacting with one another.

According to the above, in one specific example, there is a staged release of hydrogen. That is, release of hydrogen occurs in two distinct decomposition stages, i.e., reactions. In the first stage exemplified by the aforesaid alanate and amide, the alanate is decomposed by heating in the presence of the amide, to produce a hydride and aluminum, and hydrogen is released. In the second stage, the amide and newly formed hydride, in the presence of the newly formed aluminum and heat, react or decompose to produce an imide, with further release of hydrogen. Accordingly, in this two stage process, a first quantity of hydrogen is released during the first heating stage, and an additional quantity of hydrogen is released in the second heating stage.

In another aspect, the invention provides at least two hydrogen storage materials having a hydrogenated state and a dehydrogenated state. In the hydrogenated state, such composition comprises the preferred amide and a hydride. The amide is preferably represented by the general formula $MI^d(NH_2)_d^{-1}$ and the hydride is preferably represented by the general formula $MII^fH_f$, where MI and MII respectively represent cationic species or a mixture of cationic species other than hydrogen, and d and f respectively represent the average valence states.

In a dehydrogenated state, the composition preferably comprises an imide, which is represented by the formula,

$$M^c(NH)_{\frac{c}{2}}^2$$

where M represents at least one cationic species other than hydrogen and c represents the average valence state of M.

In another aspect, the invention provides a method of hydrogen storage according to the present invention, where gaseous hydrogen is contacted with the imide having such one or more cations besides hydrogen, and upon uptake of hydrogen, forms at least two distinct compounds different from the imide namely, the amide and the hydride.

As the imide takes up hydrogen for storage therein, heat is released and the aforesaid amide and hydride are formed. Thus, the imide is an exothermic hydrogen absorber. In the reverse reaction, the amide and hydride release hydrogen in the presence of one another, driven by heat, and the imide is formed. Accordingly, heat is used to cause the amide and the hydride to desorb or release hydrogen.

As can be seen, a preferred combination of two or more hydrogen-containing materials includes one which is a hydride including any compound having the formula MH, which may include both a simple hydride $M'H_f$ or a more complex one such as $ZAlH_4$ (alanate) or $ZBH_4$ (borohydride). Here, Z is desirably an alkali or mixture of alkali metals and M is desirably a metal or mixture of metals.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
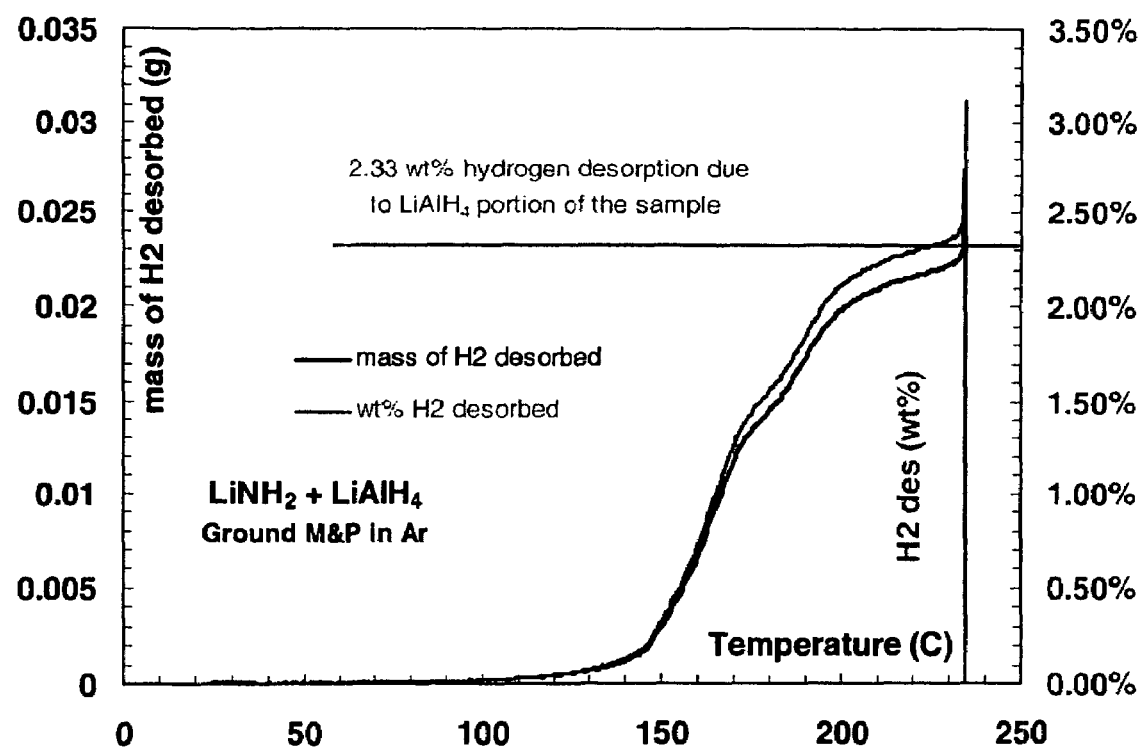
FIG. 1 shows the desorption of hydrogen versus sample temperature for an exemplary lithium amide-containing mixture.

The following description of the preferred embodiment(s) is merely exemplary in nature and is in no way intended to limit the invention, its application, or uses.

The invention utilizes a mixture of different hydrogen storage materials to take advantage of one or more different properties thereof, and/or chemical interactions which facilitate one or more of thermodynamics, kinetics and overall storage capacities. As will be further appreciated, the different hydrogen storage materials exhibit different thermodynamic and kinetic performance when desorbing hydrogen and exhibit such different performance when exposed to hydrogen.

In one aspect, the invention provides a hydrogen storage composition having a hydrogenated state and a dehydrogenated state. In the hydrogenated state, one such composition comprises an amide and a hydride. The amide is preferably represented by the general formula $MI^d(NH_2)_d^{-1}$ and the hydride is preferably represented by the general formula $MII^f H_d$, where MI and MII respectively represent cationic species or a mixture of cationic species other than hydrogen, and d and f respectively represent the average valence states. In one aspect the hydride is a complex hydride, such as an alanate or borohydride.

In a dehydrogenated state, the composition comprises an imide, which is represented by the formula $$M^c(NH)_{\frac{c}{2}}^{-2},$$

where M represents at least one cationic species other than hydrogen and c represents the average valence state of M.

In the method of hydrogen storage of the present invention, gaseous hydrogen is contacted with the imide having such one or more cations besides hydrogen, and upon uptake of hydrogen, forms at least two distinct compounds different from the imide namely, the amide and the hydride.

A preferred imide is lithium imide represented by the formula $Li_2NH$ and the preferred distinct compounds formed upon hydrogen uptake are the amide represented by formula $LiNH_2$, and the hydride represented by the formula $LiH$. In the case of the alanate ($LiAlH_4$) or borohydride ($LiBH_4$), the decomposition product also comprises additional other species such as Al or B metal.

The reactions as exemplified herein, using mixed hydrogen storage materials, demonstrate improved kinetics especially in the case of lithium amide, where a hydride or an alanate, when used in combination therewith, facilitates decomposition in two steps to release hydrogen and provides the ability to effectively reinsert hydrogen.

In one aspect, a mixture of amide $MI^d(NH_2)_d^{-1}$ and hydride $MII^f H_f$ are reacted to form an imide $$M^c(NH)_{\frac{c}{2}}^{-2}$$

and release $H_2$. The reaction is essentially completely reversible. That is, upon exposure to $H_2$, the imide takes up hydrogen to re-form the amide and hydride. Equation 1 and 1(a) are exemplary.

Equation 1:
$$MI^d(NH_2)_d^{-1} + MII^f H_f \leftrightarrow M^c(NH)_{\frac{c}{2}}^{-2}$$

Equation 1a:
$$LiNH_2 + LiH \leftrightarrow Li_2NH + H_2$$

Equation 1a exemplifies the lithium system of the generalized system of Equation 1.

In another example, decomposition to release hydrogen is exemplified by Equation 2 where the decomposition happens in steps. Initially there is a mixture of the two hydrogen containing starting materials, the exemplary alanate and the amide. From the decomposition curve, it appears that the alanate decomposes first, and then the first decomposition product interacts with the amide as further energy is added. In both steps, hydrogen gas is evolved. The decomposition products of the alanate and the amide further react in a second decomposition step to produce an amide decomposition product as shown in Equation 2, and in 2a based on exemplary lithium.

Equation 2:
$$MI^d(NH_2)_d^{-1} + M'M''H_4 \leftrightarrow$$
$$MI^d(NH_2)_d^{-1} + M'H_f + M'' + \frac{3}{2}H_2 \leftrightarrow M^c(NH)_{\frac{c}{2}}^{-2} + M'' + \frac{5}{2}H_2$$

Equation 2a:
$$LiNH_2 + LiAlH_4 \leftrightarrow LiNH_2 + LiH + Al + \frac{3}{2}H_2 \leftrightarrow Li_2NH + Al + \frac{5}{2}H_2$$

As can be seen, in Equations 2 and 2a, the preferred hydride is an H4 and contains a preferred mixture of metals. M' is preferably an alkali or mixture of alkali and M'' is preferably a metal having a +3 valence state or mixture of such +3 state metals. Examples include aluminum and boron.

It was demonstrated that hydrogen reabsorption or reinsertion does occur according to the reverse of Equation 2, although the amount of hydrogen reabsorbed is not complete so as to reinsert completely all of the evolved hydrogen. However, reversal was observed, and went to the next stage forming hydride and amide. Optimization of the relative proportions of the two hydrogen-containing starting materials leads to improvement of the amount reabsorbed. This was an optimization with regard to minimizing the existence of the metal M″ to eliminate it as free metal and to have it combined with the alkali metal into an imide type phase. This is shown by Equation 3 with an exemplary lithium.

Equation 3:

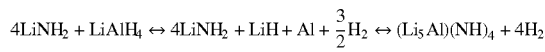

$$4LiNH_2 + LiAlH_4 \leftrightarrow 4LiNH_2 + LiH + Al + \frac{3}{2}H_2 \leftrightarrow (Li_5Al)(NH)_4 + 4H_2$$

In reaction, Equation (3), a composition was chosen to optimize conversion of alkali amide to alkali imide. It is also desirable to optimize the reaction by forming a mixed imide phase as a product in the right side of equation 2. Thus, the alkali imide produced in the second stage of Equation 4 is shown as (LiNa)NH, and is thought to be a mixture, and may be considered as ½ Li2NH+½Na2NH, or more generally as $(1-x)Li_2NH + xNa_2NH$ for $0 \leq x \leq 1$.

Equation 4:

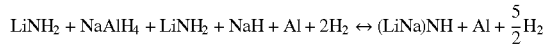

$$LiNH_2 + NaAlH_4 + LiNH_2 + NaH + Al + 2H_2 \leftrightarrow (LiNa)NH + Al + \frac{5}{2}H_2$$

It should be understood that in the present invention M, MI, MII and M′ each represent a cationic species or mixture of cationic species other than hydrogen. Examples are metal cations, non-metal cations such as boron, and non-metal cations which are organic such as CH3. Elements that form preferred amides, imides, hydride-nitrides, and mixtures of cations in the type of compounds of the present invention are as follows. For amides the cationic species comprise: Li, Be, Na, Mg, K, Ca, Ni, Rb, Sr, In, Cs, Ba, La, Sm, Eu, and Yb. For imides the cationic species comprise: Li, Mg, Ca, Sr, Ba, La, Eu, and Th. For hydride-nitride the cationic species comprise: Si, Ca, Ti, Sr, Zr, Ba, and Th. For mixed amide/imide the cationic species comprise: Li, Be, Na, Mg, Al, Si, K, Ca, Mn, Zn, Ga, Rb, Sr, Y, In, Sn, Cs, Ba, La, Pb, Ce, Nd, Sm, Eu, Gd, and Yb. For other related materials such as coordination-type NH-containing materials the cationic species comprise: Li, Be, B, Na, K, Ca, Ni, Cu, As, Se, Sr, In, Sb, La, W, Eu, and Th. Evaluation of the aforesaid known species produces, by analogy the following added cationic species besides those recited above which are thought to be usable but not yet demonstrated, include Fe, Sc, Ge, Cd, Hf, Hg, Tl, and Pr. In view of the above, the cationic species generally comprise: aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), tungsten (W), yttrium (Y), ytterbium (Yb), zinc (Zn), and zirconium (Zr).

An analysis of the behavior and crystallography of the aforesaid amides, imides, hydride/nitride, mixed amide/imide, and other related materials such as coordination-type NH-containing materials reveals that some of the aforesaid compounds such as lithium demonstrate a relatively simple chemistry of the amide and the imide. Other materials, particularly hydride/nitride compounds involving calcium and relatively heavier cation elements, form related phases based upon systematic behavior demonstrated by the imides and amides and according to the literature. Such related materials are not necessarily characterized as an amide or an imide and principally fall into the category of the hydride/nitride stated earlier. Such materials involve hydrogen and nitrogen and comprise cationic species having ammonia complex to them, so they are ammonia-containing materials, but not amides or imides. Such more complex type salts involve the aforesaid cations having a higher number of nitrogen surrounding it as compared to the amide and imides. For example, simple lithium amide has an Li coordinated with one NH2. Whereas, the more complex compounds have the lithium coordinated with more than one NH3 group. Therefore, the invention encompasses all of the hydrogen storage capable nitride/hydride type materials and compounds some of which involve cations having affinity to ammonia as well as the more traditional NH2. The invention also contemplates intermediate products arising during a series of reactions in the gas and solid phases associated with the hydrogen storage media.

It should be noted that M, MI, MII and M′ are independently selected and each may be different, or any two or more may be the same, cationic species. Preferably M, MI, MII and M′ each represent one or a mixture select from the group consisting of lithium, magnesium, sodium, boron, aluminum, beryllium, and zinc. In a preferred embodiment, all such M, MI, MII and M′ represent lithium, or mixed metal including lithium, such as LiNa.

Preferably M″ is a metal or mixture of metals having a +3 valence state, such as Al, B or mixture of Al and B. Such +3 valence state is also achievable by mixture of metals, having +2 and +4 valence state, such as Zn, Ti. Broadly, M″ is a cationic species having a +3 overall charge.

As the imide takes up hydrogen for storage therein, heat is released and the aforesaid amide and hydride are formed. Thus, the imide is an exothermic hydrogen absorber. In the reverse reaction, the amide and hydride release hydrogen in the presence of one another, driven by heat, and the imide is formed. Accordingly, heat is used to cause the amide and the hydride to desorb or release hydrogen.

Preferred temperature and pressure conditions for charging the hydrogen into the storage material are temperature range of about room temperature to about 380° C. and pressures of about 0 (vacuum) to about 10 atm. At about 380° C. and less then 10 atmospheres, hydrogen will tend to be released. At lower temperatures the pressure to release is correspondingly lower.

It should be noted that the system behaves in a manner whereby at each temperature, there is a threshold pressure above which hydrogen is absorbed and below which hydrogen is desorbed. For example, at 125° C. in order to desorb, pressure is preferably less than 10 kPa. It is possible to desorb at up to 1000 kPa at temperatures higher that about 340° C. By way of further example, at room temperature, the pressure for hydrogen release is near zero, vacuum. At elevated temperatures, on the order of 380° C., hydrogen is released until pressure is above about 10 atm. Then at such elevated pressure, hydrogen is inserted.

Particle size of the storage material is related to its performance. Particles which are too coarse extend the time for absorbtion/desorption at a given temperature. It has been found that starting material particle size on the order of 500 microns (one half millimeter) ball milled for 1 to 10 hours form suitable material. This results in particle size on the order of less than about 10 microns.

FIG. 1 shows the desorption of hydrogen versus sample temperature for an exemplary lithium amide-containing mixture. In this example, $LiNH_2 + LiAlH_4$ was ball-milled and then heated to greater than 230° C. to desorb the hydrogen. A horizontal line is shown to indicate the quantity of hydrogen available to desorb from the $LiAlH_4$ portion of the mixture, and this desorption is accomplished in the temperature range ~120° C. to 230° C. The additional desorption is due to the $LiNH_2$ portion of the sample as the LiH decomposition product from the $LiAlH_4$ desorption reacts with $LiNH_2$ to form $Li_2NH$ and release hydrogen.

Figure 2:
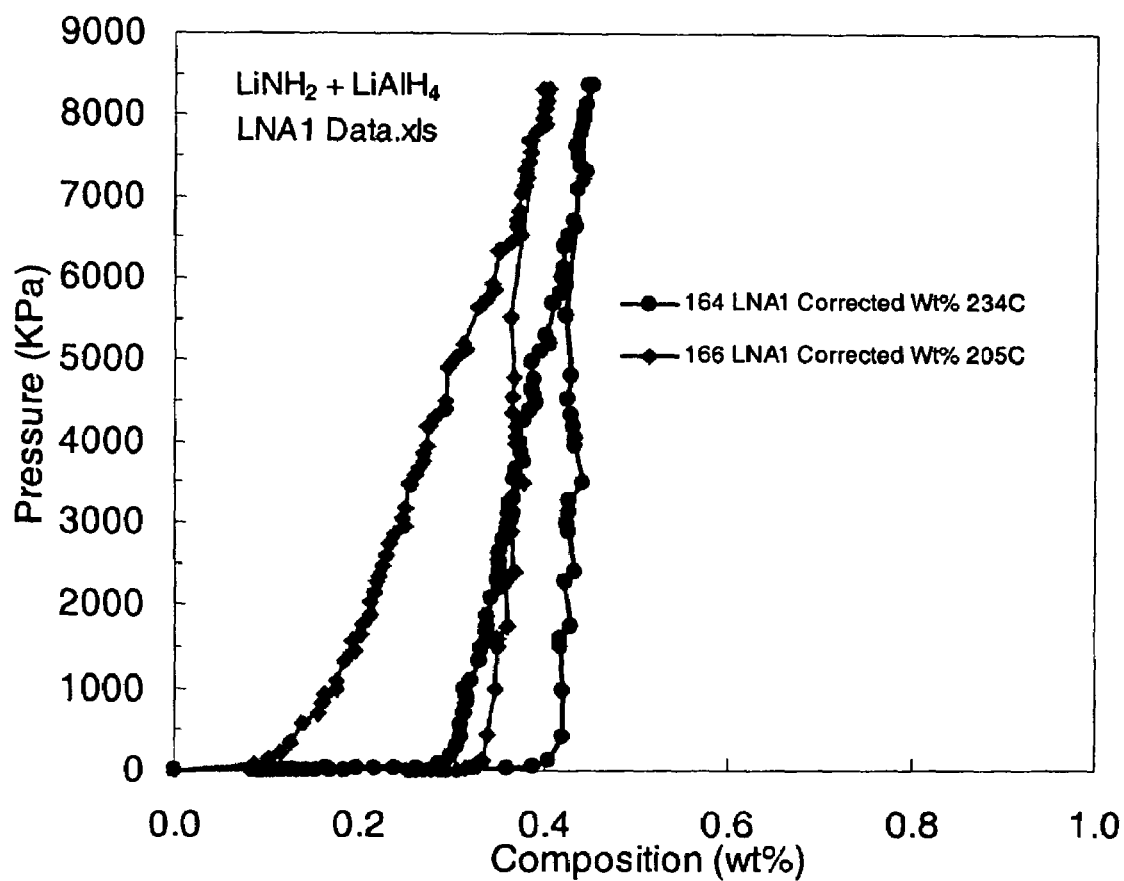
FIG. 2 shows pressure versus composition for the mixture after the desorption depicted in FIG. 1.

FIG. 2 shows pressure versus composition for the mixture as per after the desorption depicted in FIG. 1. Re-absorption and cycling of a portion of the desorbed hydrogen is demonstrated here at 205° C. and 234° C.

Thus it has been demonstrated by the above desorption and absorption mechanisms, that it is possible to take advantage of reaction energy between two distinct hydrogen containing, hydrogen storage materials to facilitate the cycling of hydrogen absorption/desorbtion. The thermodynamics of the hydrogen cycling of $LiNH_4$ is such that it is not possible to re-absorb hydrogen into the decomposition products (LiH+Al) at the temperatures and pressures accessible in the present experimental apparatus (0–500° C. and 0–9000 kPa). On the other hand, reversibility for $NaAlH_4$ can be accomplished in these ranges of pressure and temperature, but the heavy mass of Na compared to Li is not preferred. Based on the above behavior, it is inferred that a mixture of Li and Na leads to an intermediate behavior of the thermodynamics and mass and corresponding to an optimum composition. Further it has been successfully demonstrated that it is possible to recharge hydrogen into the material according to the above general reaction sequences.

Reversible hydrogen storage was successfully demonstrated in the lithium imide ($Li_2NH$), lithium amide ($LiNH_2$) lithium hydride (LiH) and alanate ($LiAlH_4$, Na $AlH_4$) systems according to the data shown in the Figures.

In Equation 1, the amide and hydride, release about 6 weight percent hydrogen and reabsorbs 6 weight percent hydrogen so that reabsorption is essentially 100% complete. Equations 2, 3 and 4 demonstrated some reversibility, although not complete. In all cases, hydrogen is released in moving from left to right in the equations.

According to the above experiments, for each 0.92 grams of $LiNH_2 + LiAlH_4$, 0.0296 grams of $H_2$ was liberated at a pressure of 34 kPa and temperature of 235 degreed Centigrade. This corresponds to 3.12% by weight of $H_2$ liberated based on the weight of the starting materials. Additional desorption was observed at this temperature when as the pressure was decreased consistent with the slow kinetics and low equilibrium pressures of the $LiNH_2$ material.

It should be noted that other systems include the following:

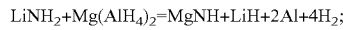
$LiNH_2 + Mg(AlH_4)_2 = MgNH + LiH + 2Al + 4H_2;$

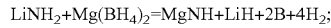
$LiNH_2 + Mg(BH_4)_2 = MgNH + LiH + 2B + 4H_2;$

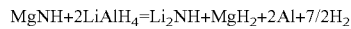
$MgNH + 2LiAlH_4 = Li_2NH + MgH_2 + 2Al + 7/2H_2$

$MgNH + 2LiBH_4 = Li_2NH + MgH_2 + 2B + 7/2H_2$

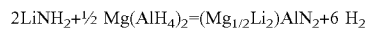
$2LiNH_2 + \frac{1}{2} Mg(AlH_4)_2 = (Mg_{1/2}Li_2)AlN_2 + 6 H_2$

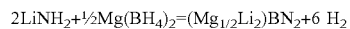
$2LiNH_2 + \frac{1}{2}Mg(BH_4)_2 = (Mg_{1/2}Li_2)BN_2 + 6 H_2$

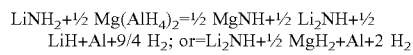
$LiNH_2 + \frac{1}{2} Mg(AlH_4)_2 = \frac{1}{2} MgNH + \frac{1}{2} Li_2NH + \frac{1}{2} LiH + Al + 9/4 H_2;$ or $= Li_2NH + \frac{1}{2} MgH_2 + Al + 2 H_2$

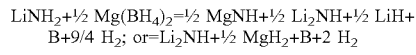
$LiNH_2 + \frac{1}{2} Mg(BH_4)_2 = \frac{1}{2} MgNH + \frac{1}{2} Li_2NH + \frac{1}{2} LiH + B + 9/4 H_2;$ or $= Li_2NH + \frac{1}{2} MgH_2 + B + 2 H_2$ Although not wishing to be held to any particular theory, a mechanism which may explain the interaction between hydrogen storage materials is thought to be as follows. In the case of Equation 1, the hydrogen containing lithium amide and the hydrogen-containing lithium hydride are mixed together. In the process of liberating hydrogen from the hydride, the remaining lithium is moved to the amide resulting in the product imide. In addition, hydrogen is released from the amide. Thus from an amide, an imide is essentially formed. When hydrogen is reabsorbed, that is, when hydrogen is reinserted into the imide material under proper temperature and pressure conditions. It can be considered that a hydrogen essentially replaces a lithium to form amide. The remaining lithium then combines with another hydrogen to form the hydride, with the resulting formation of the original amide and hydride materials. The absorption and desorption reactions, that is both directions, of Equation 1 are thought to occur in a solid phase. So that when the different hydrogen-containing starting materials are in particle to particle contact, it permits the synergistic reactions as described immediately above.

Another possible reaction mechanism may be through the gas phase involving ammonia where the lithium amide decomposes, forms ammonia, and ammonia then reacts with the lithium hydride thereby releasing the hydrogen. Accordingly, with the application of heat to the hydrogen containing starting materials some decomposition may occur with the atomic species evolved as decomposition product from one particle and becoming reabsorbed from the gas phase intermediate onto the other particle ultimately causing hydrogen evolution in the formation of the imide as shown in Equation 1. Regardless of the mechanisms suggested, it is evident that the interaction between two hydrogen containing starting materials is advantageous.

The combination of hydrogen storage materials described herein may be compared with the popular magnesium hydride storage material, where it is necessary to achieve temperatures of 300 degrees Celsius in order to cause release of hydrogen. In contrast, materials of the present invention are able to release hydrogen under less stringent conditions and on the order of as low as 175 degrees Celsius, as long as the build-up of evolved hydrogen does not pressurize the pressure vessel to the extent of inhibition of further reaction to release.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of reversibly producing a source of hydrogen gas comprising:

mixing together at least two hydrogen-containing starting materials, wherein at least one of said at least two hydrogen-containing starting materials is a complex hydride;

heating said mixed materials at a temperature sufficient to release hydrogen and to form a residue which comprises at least one material which is different from said starting materials; and regenerating at least one of said hydrogen-containing starting materials by exposing said residue to hydrogen gas.

2. The method of claim 1 wherein said starting materials comprise amide and said complex hydride.

3. The method of claim 2 wherein said residue comprises imide and said regenerating forms said amide.

4. The method of claim 1 wherein said starting materials comprise an amide, $MI^d(NH_2)_d{}^{-1}$ said complex hydride, $MII^fH_f$; said residue comprises an imide, $$M^c(NH)_{\frac{c}{2}}^{-2};$$

and said regenerating forms said amide and said complex hydride.

5. The method of claim 4 where M, MI and MII are each independently selected from the group consisting of $CH_3$, Al, As, B, Ba, Be, Ca, Cd, Ce, Cs, Cu, Eu, Fe, Ga, Gd, Ge, Hf, Hg, In, K, La, Li, Mg, Mn, Na, Nd, Ni, Pb, Pr, Rb, Sb, Sc, Se, Si, Sm, Sn, Sr, Th, Ti, Tl, W, Y, Yb, Zn, Zr, and mixtures thereof.

6. The method of claim 4 where M, MI and MII are each independently selected from the group consisting of Ba, Be, Ca, Cs, Eu, In, K, La, Li, Mg, Na, Ni, Rb, Sm, Sr, Yb, and mixtures thereof.

7. The method of claim 1 wherein said starting materials comprise an amide and an alanate.

8. The method of claim 7 wherein said residue comprises an imide, and said regenerating forms said amide.

9. The method of claim 8 wherein said amide is represented by $MI^d(NH_2)_d{}^{-1}$; said imide is represented by $$M^c(NH_2)_{\frac{c}{2}}^{-2}$$

and said alanate is represented by $M'M''H_4$; where M" represents a +3 charge species, and where M, MI and M' each represent a cationic species different from hydrogen.

10. The method of claim 9 wherein said cationic species is selected from the group consisting of $CH_3$, Al, As, B, Ba, Be, Ca, Cd, Ce, Cs, Cu, Eu, Fe, Ga, Gd, Ge, Hf, Hg, In, K, La, Li, Mg, Mn, Na, Nd, Ni, Pb, Pr, Rb, Sb, Sc, Se, Si, Sm, Sn, Sr, Th, Ti, Tl, W, Y, Yb, Zn, Zr, and mixtures thereof.

11. The method of claim 9 wherein said catlonic species is selected from the group consisting of Ba, Be, Ca, Cs, Eu, In, K, La, Li, Mg, Na, Ni, Rb, Sm, Sr, Yb, and mbctures thereof.

12. The method of claim 9 wherein said M" is selected from the group consisting of aluminum, boron, and mbctures thereof.

13. The method of claim 9 wherein said M" is a mixture of elements having an average +3 charge.

14. The method of claim 13 wherein said mixture of elements is a mixture of $Ti^{+4}$ and $Zn^{+2}$.

15. The method of claim 7 wherein the heating is conducted in two stages; a first stage where said alanate is decomposed in the presence of said amide to release hydrogen, and to produce a hydride and aluminum; and second stage, where said amide and said hydride react in the presence of said aluminum to further release hydrogen.

16. The method of claim 15 wherein said first and second stages are conducted according to:

$$LiNH_2 + LiAlH_4 \rightarrow LiNH_2 + LiH + Al + \frac{3}{2}H_2 \rightarrow Li_2NH + Al + \frac{5}{2}H_2.$$

17. The method of claim 15 wherein said first and second stages are conducted according to:

4 $LiNH_2$+$LiAlH_4$→4 $LiNH_2$+$LiH$+$Al$+3/2 $H_2$→
[$Li_5Al$][$NH$]$_4$+4 $H_2$.

18. The method of claim 15 wherein said first and second ststages are conducted according to:

$$LiNH_2 + NaAlH_4 \rightarrow LiNH_2 + NaH + Al + 2H_2 \rightarrow (LiNa)NH + Al + \frac{5}{2}H_2.$$

19. The method of claim 9 wherein said $M'M''H_4$ is selected from the group consisting of $LiAlH_4$, $NaAlH_4$, $LiBH_4$, $NaBH_4$ and mixtures thereof.

20. A hydrogen storage medium having a hydrogenated state and a dehydrogenated state:
(a) in said hydrogenated state, said medium comprises an amide and a complex hydride; and
(b) in said dehydrogenated state, said medium comprises a residue which comprises at least one material which is different from said amide or said complex hydride.

21. The hydrogen storage medium of claim 20 wherein said complex hydride is an alanate represented by the formula $ZAlH_4$ where Z comprises at least one selected from the group consisting of alkali and alkaline earth metals.

22. The hydrogen storage medium of claim 21 wherein Z is lithium and the alanate is $LiAlH_4$.

23. The hydrogen storage medium of claim 20 wherein said complex hydride is a borohydride represented by $ZBH_4$ and Z comprises at least one selected from the group consisting of alkali and alkaline earth metals.

24. The hydrogen storage medium of claim 20 wherein said amide is represented by the formula $LiNH_2$.

25. The hydrogen storage medium of claim 20 wherein said hydride is represented by the formula LiH.

26. The hydrogen storage medium of claim 20 wherein said residue comprises a hydride which is different from said hydrogenated state complex hydride.

27. The hydrogen storage medium of claim 26 wherein said hydrogenated state hydride is an alanate and said different hydride of said residue is an alkali or alkaline earth hydride.

28. The hydrogen storage medium of claim 26 wherein said hydrogenated state hydride is a borohydride and said different hydride is an alkali or alkaline earth hydride.

29. The hydrogen storage medium of claim 20 wherein said hydrogenated state hydride is selected from the group consisting of $LiAH_4$, $NaAlH_4$, $NaBH_4$, $LiBH_4$, and mixtures thereof.

30. A method of producing a source of hydrogen gas comprising: liberating hydrogen from a hydrogenated composition comprising at least two different hydrogen-containing starting materials including at least one complex hydride by heating said hydrogenated composition at an elevated temperature sufficient to evolve hydrogen gas therefrom, thereby producing dehydrogenated product which comprises a material which is different from at least one of said starting materials.

* * * * *